United States Patent Office 3,684,559 Patented Aug. 15, 1972

3,684,559

METHOD OF FLAME-PROOFING CELLULOSIC MATERIALS AND PRODUCT PRODUCED THEREBY

Jay C. Chapin, Chicago, Ill., assignor to Ventron Instruments Corp., Scientific Chemicals Division No Drawing. Filed Nov. 6, 1969, Ser. No. 874,704
Int. Cl. C09k *3/28*; D06m *13/26*
U.S. Cl. 117—102 R 2 Claims

ABSTRACT OF THE DISCLOSURE

A method of rendering cellulosic fibers and/or fabric fire resistant and self-extinguishing by attachment to the fibers of a water soluble resinous product which is formed by the treatment of a product of reaction of anhydrous ammonia and a phosphoric acid anhydride with aqueous ammonium hydroxide in a trichlorethylene slurry and heat curing the resinous product on the fibers to a water insoluble adherent material. The presence of 3% to 7% by weight of dicyandiamide in the fabric treating aqueous composition permits use of higher temperatures for the curing of the finish on the fabric.

This invention relates to a method of rendering cellulosic materials fire resistant and self-extinuishing. More particularly, it relates to the products of reaction of aqueous ammonium hydroxide with reaction products of anhydrous ammonia and phosphoric pentoxide capable of flameproofing cellulosic materials. Still more particularly, it relates to cellulosic fabrics having a fire retardant finish of complex resinous nitrogen-phosphorus compounds.

Briefly, the method of preparing the complex resinous nitrogen-phosphorus compounds of this invention comprises the steps of reacting a product of reaction of anhydrous ammonia and phosphoric acid such as the anhydride and halogen derivatives of phosphorus acids, with aqueous ammonium hydroxide at temperatures in the range between about −10° C. (+14° F.) and 40° C. (104° F.), said ammonium hydroxide providing an ammonia concentration of less than 21%, to convert the product of reaction to a complex water soluble polymerized form.

In producing flame retardant textiles which are basically cellulosic materials, the water solution of reaction product produced by the reaction with dilute aqueous ammonium hydroxide may be applied directly to the fabrics or may be diluted with an aqueous medium, in amounts producing a solution having 5% to 75% by weight of solute, preferably 40% to 60% by weight. This aqueous solution of reaction product, with or without the presence of an amine buffer salt, is maintained at a temperature in the range between 30° C. (86° F.) and 100° C. (212° F.) and the solution is applied to the textile fabric to effect a wet weight add-on of about 25% to 100% by weight of the fabric. The impregnated fabric is subjected to temperatures in the range between about 120° C. (248° F.) and 190° C. (374° F.), preferably after drying the coated fabric, to effect a cure and render the cured resinous material resistant to washing out during laundering.

Agents capable of retarding burning of cellulosic materials are in common use. Diammonium phosphate is such a flameproofing agent. The problem is the non-permanency of the flameproofing imparted by this agent. Diammonium phosphate is so soluble in aqueous mediums that it washes out in the first laundering and the flameproofing is lost.

The chemical industry has developed numerous agents which be applied to fabrics to impart flameproofing properties.

The Costello Pat. No. 2,964,377 shows a reaction product that is produced by reaction of an excess of concentrated ammonium hydroxide having between 23% and 28% ammonia concentration with a product of reaction of anhydrous ammonia and a phosphoric acid derivative. Such reaction products are unstable in storage and crystallize, for example, in 30 days to give a solid product which is difficult to redissolve in aqueous medium to be used to saturate cellulose fabrics with flame retardant materials. The patent suggests that the flameproofing lasts for only four or five laundering operations and that to offset this loss, there be an after treatment with a resin such as urea formaldehyde.

This illustrates a primary problem, namely, that many agents which can import flame retardancy to cotton fabrics, cannot be rendered sufficiently resistant to alkaline type laundering compositions and the fabric progressively loses its flame retardant properties. Another problem in this field has been that agents which flameproof synthetic resin fabrics are generally ineffective for cellulosic fabrics such as cotton and vice versa. Still another problem has been that steps necessary to adhering the flame retardant finish has resulted in such deleterious effects as charring and tenderizing of the cellulose fibers.

Now it has been discovered that cellulosic fibers and/or fabrics or fabrics which are blends of cellulose fibers and synthetic resin fibers can be treated to retain desirable properties of the cellulose fibers and to develop the property of resistance to burning and flameproofing. These properties are provided by an initially water soluble complex reaction product of the reaction of dilute aqueous ammonium hydroxide with a reaction product of anhydrous ammonia and a phosphorus compound such as phosphoric acid anhydride, which initially water soluble complex reaction product can be cured to a finish that matches the flexibility of the fabric, i.e., gives a soft hand, and resists removal by drycleaning and laundering chemicals.

In accordance with the invention, the new products for treating cellulosic material are produced by slurrying a product of reaction of anhydrous ammonia and phosphoric acid anhydride in a carrier liquid such as trichlorethylene, admixing water and ammonium hydroxide with the slurry in empirically determined amounts, said ammonium hydroxide providing an ammonia concentration in the range between about 10% and 21%, maintaining the mixture at a temperature in the range between −10° C. and 40° C. until, upon standing without agitation, a homogeneous lower liquid phase separates from the top floating carrier liquid phase, and separating the phases to recover the homogeneous product as a liquid containing 30% to 50% by weight of water.

The product of the process is a solution of a complex mixture of polymeric materials, the solution containing 70% to 50% of polymer solids and 30% to 50% water. Such solutions are a stable syrup, the resinous solids of which produce a finish on cellulosic materials that has substantially improved laundering life over products of reaction of anhydrous ammonia and phosphoric acid derivatives.

The stable syrup product is a mixture of polymers of different phosphorus atom chain lengths or arrangements. An analysis of the phosphorus-containing starting material shows that it contains:

from 70% to 80% $P_2O_5$
from 5% to 10% nuclear or amide nitrogen
from 12% to 18% ammoniacal nitrogen.

Theoretically, a large number of possible structural formulas can be drawn for the starting materials in the preparation of the products of the above-described method of manufacture.

In view of the uncertain structure of the starting materials such as the reaction product of anhydrous ammonia and phosphorus oxychloride, etc., it is not possible to designate a definite structural formula for the stable syrup product which produces a cured finish on cellulosic materials that has substantially improved laundering life over products of reaction of anhydrous ammonia and phosphoric acid derivatives.

In the instant process, the solid product of reaction of anhydrous ammonia with phosphoric acid derivatives, the N-P starting material is preferably slurried with a carrier liquid which has a specific gravity of less than about 1.6 and is insoluble in water. Typical carriers useful for the instant purposes are polyhalogen alkyl compounds such as trichlorethylene, carbon tetrachloride, trichloro-methane, tribromoethylene, tetrachloroethane, and the like. In preparing slurries, the ratio by weight of carrier to N-P product of reaction generally is in the range between 1.1:1 and 1.75:1.

The temperature at which the reaction is carried out must be sufficiently low to avoid volatilizing ammonia from the aqueous mixture. The range of useful temperatures is about −10° C. (+14° F.) to 40° C. (104° F.) with temperatures in the range between about 20° C. and 35° C. preferred.

In view of the complexity of the N-P starting material, it is not possible to set forth the ratio of reactants on a stoichiometric basis. The ratio of reactants on a basis of experimentally determined weights is 100 parts N-P starting material, 30 to 50 parts of 26° Bé. ammonium hydroxide and 10 to 40 parts of water, i.e., a weight ratio of ammonia to N-P starting material in the range between 1:5 and 1:12, preferably between 1:9 and 1:11.

The ammonia in solution as ammonium hydroxide is present in concentrations in the range between about 10% and 21%, preferably in the range between about 16% and 19% by weight.

The resinous reaction products of this invention, i.e., the syrupy liquid which may contain up to 40% of water, may be applied directly or in a water diluted form to cellulosic materials. The syrupy liquid directly applied to rayon and similar cellulose materials may be cured to a water insoluble flame-proofing finish without deleterious effect on the fibers and/or fabric. Because of the sensitivity of cotton to charring, etc., it is preferred to incorporate in the aqueous resin solutions dicyandiamide, most of which is removed together with unreacted resinous product in the rinse of the fabric after the curing operation.

The rinse with water removes water soluble constituents present on the cured fibers or fabrics and leaves a protective finish of cured polymerization product adhered thereto. The quantity of cured polymerization product required to provide satisfactory retardancy and laundering durability is generally in the range between about 10% and 30% dry add on weight, the amount depending upon the thickness and construction of the fabric.

The polymerization products of this invention are effective flame retardants for a wide range of filamentous materials including cotton and blends thereof with polyesters, rayons, acrylics, etc.

The invention is illustrated by the following examples which are given by way of illustration and without any intention that the invention be limited thereto.

EXAMPLE I

Example I is the preferred embodiment of the method of manufacturing the polymerization products.

500 parts by weight of powdered anhydrous $NH_3$-$P_2O_5$ reaction product (commercial product "Victamide" produced by Victor Chemical Works) having an analysis of approximately 76.1% $P_2O_5$, 5.8% nuclear or amide nitrogen and 12.7% ammonium nitrogen, were mixed with 700 parts by weight of trichlorethylene to form a slurry.

203 parts by weight of 27% ammonium hydroxide and 119 parts by weight of water is added to the slurry maintained at a temperature of about 25° C. (177° F.) with agitation.

After standing without agitation for about 16 hours, the contents of the agitation tank separate into two distinct phases, a top layer which is the trichlorethylene and the bottom layer that is the polymerization product which is a syrupy solution containing approximately 35% by weight of water.

EXAMPLE II

The preferred mode of providing a cotton fabric with a fire retardant coating is as follows:

An aqueous coating composition is prepared from the polymerization product of Example I, by heating approximately 225 pounds of water to a temperature of about 71° C., i.e., in the range between 65° C. (149° F.) and 80° C. (176° F.). Approximately 175 pounds of the product of Example I and 15 pounds of dicyandiamide buffer are added to the hot water and the tank contents agitated until there is complete solution.

A 6.5 ounce cotton duck is passed through the hot solution. After passage, between squeeze rolls, the cotton duck picks up approximately 70% wet weight. After drying at 110° C., the cotton duck shows a dry add on 20% by weight. The treated fabric was cured at 325° F. (163° C.) for 3 minutes.

This treated cotton duck was tested for flame resistance by the 1951 Federal Specifications Method No. 5902, CCC–T–191*b*.

The treated cotton duck which showed no discoloration or evidence of charring prior to flame testing, was immediately self-extinguishing after 12 second exposure to a Bunsen gas burner flame. The untreated control sample of cotton duck was completely consumed after removal of the initiating flame.

The cotton fabric of Example II was subjected to 10 washings. After each washing, the fabric was dried in an air circulating oven at 110° C. (230° F.). The permanency of the fire retardant finish was determined by the above-identified Federal test procedure.

The washed test sample of treated cotton duck was self-extinguishing in 2.5 seconds after 12 second exposure to a Bunsen gas burner flame. Comparison of the self-extinguishing time before and after the 10 washings indicates a gradual loss of fire retardancy.

If it is desired to render the cellulosic materials flamepoof even more permanent against repeated laundering cycles, the reaction products such as that produced in Example I may be provided with an organic radical to block the amine group against replacement by a metallic cation such as sodium during laundering which replacement forms products of greatly reduced flame retardant properties.

The reaction products having a blocked amine group are produced as follows:

450 parts by weight of reaction product of Example I is mixed with 450 parts by weight of water and 150 parts by weight of polyethyleneimine (Dow Chemical Company PEI–18). A 6.5 ounce duck is treated with this solution. The wet pickup was 70%. The fabric was dried at 250° F. for 3 minutes and then cured at 310° F. for 4 minutes. The dry add-on was 24%. After rinsing the fabric, the dry, add-on of reaction product was reduced to 18.5%. After 5 washings in a detergent solution containing 0.5% of sodium N-methyl-n-oleoyl taurate (Antara Chemical Company Igepon T–73) and maintained at 130° F., the add-on was reduced to 14% and after 10 washings, the add-on was 12%. The initial char length of the treated material (after rinsing only) was 4.8 inches and after 10 washings was 5.8. The combination of polyethyleneimine and the polymerization product of Example I produces a flameproofing finish that is about twice as durable to laundering as the polymerization product of Example I alone. At room temperature, the product is a homogeneous aqueous solution.

The presence of 3% to 7% by weight of dicyandiamide in the fabric treating aqueous composition permits use of higher temperatures for the curing of the finish on the fabric. Higher cure temperature result in shorter cure time. For example, at 300° F., ten minutes is required to obtain an effective cure whereas, at 350° F., only 90 seconds are required for a cure. However, in the absence of dicyandiamide, curing is limited to the lower temperature because at 350° F., reaction product treated cellulosic materials are markedly degraded by deleterious loss of tensile and tear strength and severe discoloration.

I claim:

1. The method of imparting fire retardancy properties to cellulosic filamentous materials and blends thereof with synthetic fibers which comprises saturating the fibers with a dicyandiamide-containing treating solution selected from the group consisting of the aqueous solution of polymeric product prepared by reacting a product of reaction of anhydrous ammonia and a phosphoric acid compound selected from the group consisting of phosphorus pentoxide and phosphorus oxychloride, with aqueous ammonium hydroxide of an ammonia concentration in the range between about 10% and 21%, at temperatures in the range between about —10° C. and 40° C. and aqueous solutions of said polymeric product diluted with aqueous medium, said treating solution being maintained at a temperature in the range between 30° C. and 100° C. containing between 5% and 75% by weight of polymeric product and between 3% and 7% by weight of dicyandiamide as solutes, subjecting the treated filamentous materials to a curing operation at a temperature in the range between about 150° C. and 192° C., and rinsing out the coated fibers with aqueous medium after said curing step to remove components of the aqueous treating solution including dicyandiamide which are still water soluble.

2. A fire retardant woven fabric prepared with cotton filaments as a characterizing component comprising woven filaments having between 10% and 30% by weight of the total composition in the form of a water insoluble finish which is the product of deposition of the polymeric reaction product while it is a solute component of an aqueous composition containing dicyandiamide in quantities constituting a weight ratio of reaction product to dicyandiamide of approximately 175:15 and of curing said polymeric product in the presence of said dicyandiamide at temperatures in the range between about 350° F. and 374° F. and of rinsing out of water soluble components including dicyandiamide after said curing step, said polymeric reaction product being produced by reacting a product of reaction of anhydrous ammonia and a phosphoric acid compound selected from the group consisting of phosphorus pentoxide and phosphorus oxychloride, with aqueous ammonium hydroxide of an ammonia concentration in the range between about 10% and 21%, at temperatures in the range between about —10° C. and 40° C.

References Cited

UNITED STATES PATENTS

| | | | |
|---|---|---|---|
| 2,964,377 | 12/1960 | Costello | 117—138 X |
| 2,771,379 | 11/1956 | Di Dario | 117—136 X |
| 2,661,264 | 12/1953 | Malowan | 23—357 |
| 2,917,408 | 12/1959 | Goldstein et al. | 117—137 X |
| 2,996,357 | 8/1961 | Koster et al. | 23—357 |
| 3,002,807 | 10/1961 | Becke | 23—357 |
| 3,032,440 | 5/1962 | Iannazzi | 117—138 |

WILLIAM D. MARTIN, Primary Examiner

H. J. GWINNELL, Assistant Examiner

U.S. Cl. X.R.

117—137, 138, 143 A